United States Patent
Lowe et al.

(10) Patent No.: US 12,123,313 B2
(45) Date of Patent: Oct. 22, 2024

(54) IN-FLIGHT MEASURED PROPULSION MASS FLOW AND THRUST ON AIRCRAFT

(71) Applicant: RTX Corporation, Farmington, CT (US)

(72) Inventors: Kevin Todd Lowe, Blacksburg, VA (US); Gwibo Byun, Blacksburg, VA (US); Albert P. Krejmas, Wethersfield, CT (US)

(73) Assignee: RTX CORPORATION, Farmington, CT (US)

( * ) Notice: Subject to any disclaimer, the term of this patent is extended or adjusted under 35 U.S.C. 154(b) by 66 days.

(21) Appl. No.: 17/366,654

(22) Filed: Jul. 2, 2021

(65) Prior Publication Data

US 2023/0013891 A1 Jan. 19, 2023

(51) Int. Cl.
| | | |
|---|---|---|
| *F01D 21/00* | (2006.01) | |
| *B64D 27/18* | (2006.01) | |
| *B64D 43/00* | (2006.01) | |
| *F02C 9/00* | (2006.01) | |
| *G01F 1/661* | (2022.01) | |

(52) U.S. Cl.
CPC ........... *F01D 21/003* (2013.01); *B64D 27/18* (2013.01); *B64D 43/00* (2013.01); *F02C 9/00* (2013.01);
(Continued)

(58) Field of Classification Search
CPC .. F01D 21/003; F01D 17/08; F05D 2270/051; F05D 2270/8041; F05D 2260/80; F05D 2270/3061; F05D 2270/804; B64D 43/00; G01F 1/661; G01F 1/86; G01F 1/66; G01F 1/662; G01F 1/663; F02C 9/00; G01N 15/0205; G01N 15/3504; G01N 2015/3513; G01N 2011/006; G01N 2011/008; G01N 2011/0093; G01N 11/02; G01N 21/47; G01N 21/49; G01N 21/53; G01N 21/85; G01N 2021/8578; G01M 9/065; G01M 9/067; G01M 15/10;
(Continued)

(56) References Cited

U.S. PATENT DOCUMENTS

| | | | | |
|---|---|---|---|---|
| 5,178,002 A | * | 1/1993 | Hanson | ..................... G01P 5/26 |
| | | | | 73/112.04 |
| 6,912,480 B2 | | 6/2005 | Black | |

(Continued)

FOREIGN PATENT DOCUMENTS

| | | |
|---|---|---|
| EP | 3255438 A1 | 12/2017 |
| EP | 3210464 A2 | 1/2018 |

OTHER PUBLICATIONS

Shirley et al., "Air-mass flux measurement system using Doppler-shifted filtered Rayleigh scattering" 31st Aerospace Sciences Meeting; Jan. 1, 1993; 10 pages.
(Continued)

*Primary Examiner* — Brian P Wolcott
*Assistant Examiner* — Jesse M Prager
(74) *Attorney, Agent, or Firm* — CANTOR COLBURN LLP (57) ABSTRACT

An aircraft includes a gas turbine engine and an optically-based measurement system. The gas turbine engine is configured to ingest a first mass flow and to exhaust a second mass flow. The optically-based measurement system is configured to determine the first and second mass flows in response to performing an imaging process on the gas turbine engine.

6 Claims, 3 Drawing Sheets

(52) U.S. Cl.
CPC ........ *G01F 1/661* (2013.01); *F05D 2220/323* (2013.01); *F05D 2260/80* (2013.01); *F05D 2270/3061* (2013.01); *F05D 2270/804* (2013.01)

(58) Field of Classification Search
CPC .. G01M 15/102; G01M 15/108; G01M 15/14; G01J 5/0014; G01J 5/0088
See application file for complete search history.

(56) References Cited

U.S. PATENT DOCUMENTS

| | | | |
|---|---|---|---|
| 9,334,807 B2* | 5/2016 | deGaribody | G01S 17/02 |
| 10,161,773 B2* | 12/2018 | deGaribody | F02C 7/04 |
| 10,450,966 B2 | 10/2019 | Blanchard et al. | |
| 2014/0268158 A1* | 9/2014 | Tanriverdi | G01P 5/26 |
| | | | 356/438 |
| 2015/0330310 A1 | 11/2015 | Degaribody | |
| 2017/0356303 A1* | 12/2017 | Hodge | G01M 15/14 |
| 2018/0088045 A1* | 3/2018 | Garde | G01S 17/86 |
| 2022/0074368 A1* | 3/2022 | Kyritsis | F01D 17/08 |
| 2022/0074770 A1* | 3/2022 | Kyritsis | F01D 17/08 |
| 2022/0074772 A1* | 3/2022 | Kyritsis | G01F 1/667 |
| 2022/0074816 A1* | 3/2022 | Kyritsis | G01M 15/14 |

OTHER PUBLICATIONS

Search Report issued in European Patent Application No. 22182884.1; Application Filing Date Jul. 4, 2022; Date of Mailing Nov. 24, 2022 (6 pages).

* cited by examiner

IN-FLIGHT MEASURED PROPULSION MASS FLOW AND THRUST ON AIRCRAFT

BACKGROUND

The subject matter disclosed herein generally relates to aircraft engines, and more particularly, to measured propulsion mass flow and thrust on aircrafts.

An airplane or other vehicle may include a propulsion system having one or more gas turbine engines for generating an amount of thrust, or for generating power to be transferred to a thrust generating device. The gas turbine engine generally includes turbomachinery. The turbomachinery, in turn, generally includes a compressor section, a combustion section, a turbine section, and an exhaust section.

During operation of the gas turbine engine, air is provided to an inlet of the compressor section where one or more axial compressors progressively compress the air until it reaches the combustion section. Fuel is mixed with the compressed air and burned within the combustion section to provide combustion gases, which are routed from the combustion section to the turbine section. The flow of combustion gasses through the turbine section drives the turbine section and is then routed through the exhaust section, e.g., to atmosphere.

SUMMARY

According to a non-limiting embodiment, an aircraft includes a gas turbine engine and an optically-based measurement system. The gas turbine engine is configured to ingest a first mass flow and to exhaust a second mass flow. The optically-based measurement system is configured to determine the first and second mass flows in response to performing an imaging process on the gas turbine engine.

The aircraft includes an additional feature wherein the optically-based measurement system comprises a first imaging system configured to perform a first imaging of a first target area of the gas turbine engine and a second imaging system configured to perform a second imaging of a second target area of the gas turbine engine.

The aircraft includes an additional feature wherein the measurement controller calculates the first mass flow and the second mass flow based at least in part on the first imaging and the second imaging, respectively.

The aircraft includes an additional feature wherein the measurement controller calculates a thrust force of the gas turbine engine while the aircraft is in flight based at least in part on the calculated first mass flow and the calculated second mass flow.

The aircraft includes an additional feature wherein the first imaging system comprises a first energy source configured to direct first energy at the first target area and a first sensor configured to detect a first energy spectrum at the first target area resulting from the first energy, and wherein the second imaging system comprises a second energy source configured to direct second energy at the second target area and a second sensor configured to detect a second energy spectrum at the second target area resulting from the second energy.

The aircraft includes an additional feature wherein the first energy source is coupled to a body of the aircraft and is remotely located from the gas turbine engine.

The aircraft includes an additional feature, wherein the first energy source is disposed within an inlet of the gas turbine engine.

According to another non-limiting embodiment, an optically-based measurement system comprises a first imaging system and a second imaging system. The first imaging system is configured to perform a first imaging of a first target area of a gas turbine engine operating while the aircraft is in flight. The second imaging system is configured to perform a second imaging of a second target area of the gas turbine engine operating while the aircraft is in flight. The optically-based measurement system further comprises a measurement controller configured to calculate the first mass flow and the second mass flow based at least in part on the first imaging and the second imaging, respectively.

The optically-based measurement system includes an additional feature wherein the measurement controller is configured to calculate a thrust force of the gas turbine engine while the aircraft is in flight based at least in part on the calculated first mass flow and the calculated second mass flow.

The optically-based measurement system includes an additional feature wherein the measurement controller calculates the first mass flow and the second mass flow based at least in part on the first imaging and the second imaging, respectively.

The optically-based measurement system includes an additional feature wherein the measurement controller calculates a thrust force of the gas turbine engine while the aircraft is in flight based at least in part on the calculated first mass flow and the calculated second mass flow.

The optically-based measurement system includes an additional feature wherein the first imaging system comprises a first energy source configured to direct first energy at the first target area and a first sensor configured to detect a first energy spectrum at the first target area resulting from the first energy, and wherein the second imaging system comprises a second energy source configured to direct second energy at the second target area and a second sensor configured to detect a second energy spectrum at the second target area resulting from the second energy.

The optically-based measurement system includes an additional feature wherein the first energy source is coupled to a body of the aircraft and is remotely located from the gas turbine engine.

The optically-based measurement system includes an additional feature wherein the first energy source is disposed within an inlet of the gas turbine engine.

According to yet another non-limiting embodiment, a method of monitoring a gas turbine engine during flight of an aircraft comprises operating the gas turbine engine to ingest a first mass flow and to exhaust a second mass flow, and performing an imaging process on the gas turbine engine during the flight of the aircraft. The method further comprises calculating, via an optically-based measurement system, the first and second mass flows based at least in part on the imaging process.

The method includes additional operations comprising performing, via a first imaging system, a first imaging of a first target area of the gas turbine engine, performing, via a second imaging system, a second imaging of a second target area of the gas turbine engine, calculating, via a measurement controller, the first mass flow based at least in part on the first imaging, and calculating the second mass flow based at least in part on the second imaging.

The method includes additional operations comprising calculating, via the measurement controller, a thrust force of the gas turbine engine while the aircraft is in flight based at least in part on the calculated first mass flow and the calculated second mass flow.

The method includes additional operations comprising directing, via a first energy source, first energy at the first target area, sensing, via a first sensor, a first energy spectrum at the first target area resulting from the first energy, directing, via a second energy source, second energy at the second target area, and sensing, via a second sensor, a second energy spectrum at the second target area resulting from the second energy.

The method includes an additional feature, wherein the first energy source is coupled to a body of the aircraft and is remotely located from the gas turbine engine.

The method includes an additional feature, wherein the first energy source is disposed within an inlet of the gas turbine engine.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

An amount of thrust provided by a gas turbine engine is typically determined according to several estimated values of the gas turbine engine rather than in-flight measured parameters. However, such a determination method may result in relatively inaccurate thrust information. Further, it may be beneficial for a control system of the gas turbine engine or vehicle to receive and/or use relatively accurate information regarding an amount of thrust in order to more appropriately control various operations of the gas turbine engine.

When quantifying the performance of gas turbine engines, there is a need to ascertain the ingested air mass flow and net thrust in flight. Altitude test chambers are available for engine thrust measurement, but are extremely expensive to maintain and operate. Current methods for estimating mass flow and net thrust rely upon extrapolations from ground-based measurements, whereas direct measurement would provide performance information useful for improving the integration of gas turbine engines with airframes.

Various non-limiting embodiments described herein provide an optically-based propulsion mass flow and thrust measurement system capable of performing a direct, non-intrusive measurement of thrust and mass flow of an installed propulsion engine of an aircraft while in flight. In one or more non-limiting embodiments, the measurement system includes one or more lasers that probe the inflow and out-flow planes and spectrally-sensitive cameras that image the laser probe planes to obtain velocity and density measurements from the spectrum of light scattered by flow gas molecules. The scattered spectrum of light is commonly referred to as "Rayleigh scattering", "Filter Rayleigh scattering" (FRS), or "Rayleigh/Mie scattering effect", which occurs when light photons interact with local molecules or particles, respectively. The interaction between the photons and the molecules and particles produces an elastic scattering of light, which can be detected by an optical sensor.

According to one or more embodiments, the detected scattered spectrum of light can be analyzed according to optical filter spectroscopy during in flight of the aircraft. The measurement system utilizes field measurements of flow density and velocity obtained from the optical filter spectroscopy analysis to compute mass and momentum flux at planes upstream and downstream of the engine (e.g., at the front and rear of the engine) to evaluate the rigorous integral conservation equations for mass flow and thrust. Accordingly, the ability to accurately and reliably measure installed engine thrust in flight as provided by the measurement system described herein supports both engine manufacturers and airframe manufacturers in determining the delivered thrust level.

Figure 1:
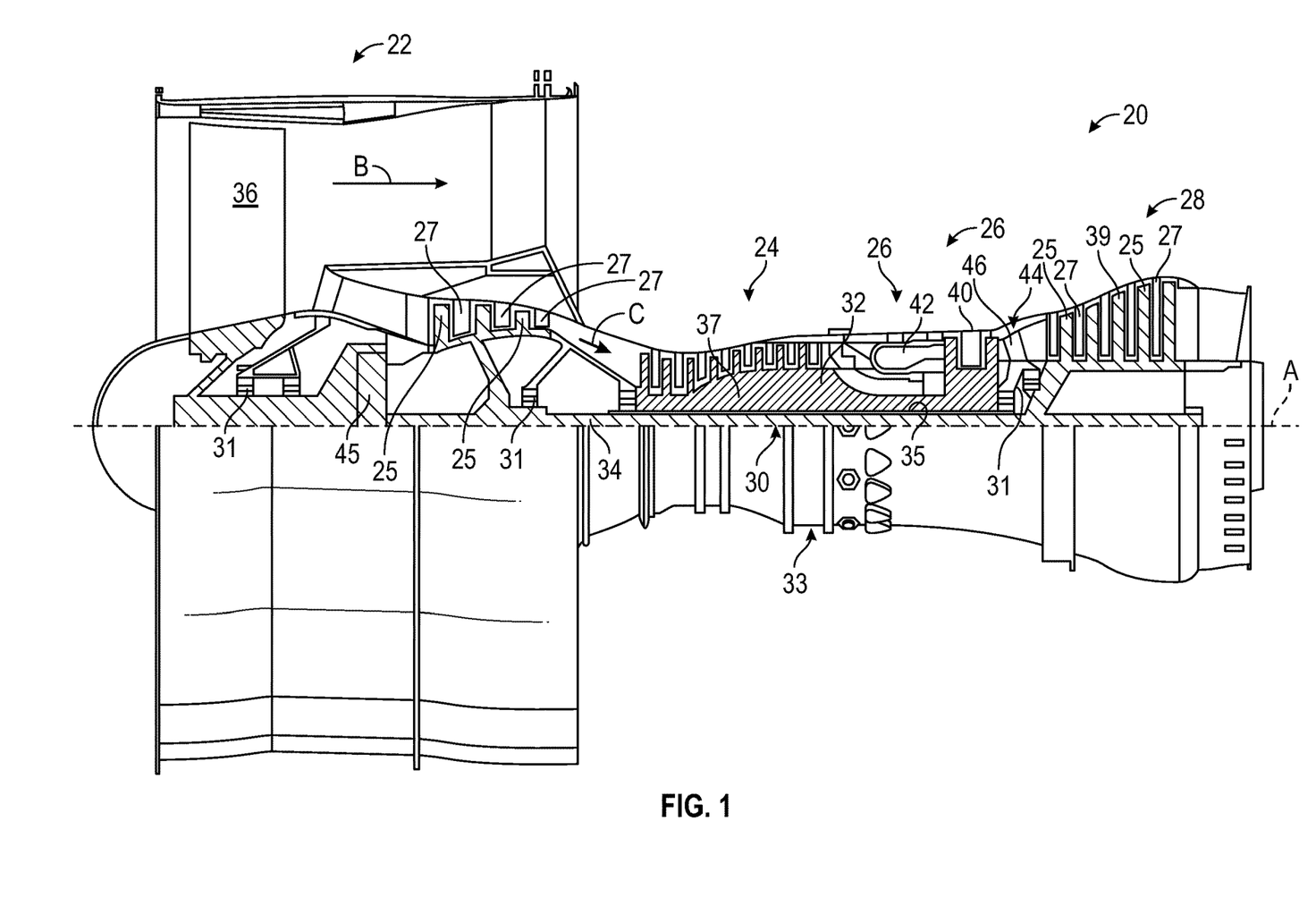
FIG. 1 is a schematic cross-sectional illustration of a gas turbine engine architecture that may employ various embodiments disclosed herein.

FIG. 1 schematically illustrates a gas turbine engine 20. The exemplary gas turbine engine 20 is a two-spool turbofan engine that generally incorporates a fan section 22, a compressor section 24, a combustor section 26, and a turbine section 28. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines.

The gas turbine engine 20 generally includes a low-speed spool 30 and a high-speed spool 32 mounted for rotation about an engine centerline longitudinal axis A. The low-speed spool 30 and the high-speed spool 32 may be mounted relative to an engine static structure 33 via several bearing systems 31. It should be understood that other bearing systems 31 may alternatively or additionally be provided.

The low-speed spool 30 generally includes an inner shaft 34 that interconnects a fan 36, a low-pressure compressor 38 and a low-pressure turbine 39. The inner shaft 34 can be connected to the fan 36 through a geared architecture 45 to drive the fan 36 at a lower speed than the low-speed spool 30. The high-speed spool 32 includes an outer shaft 35 that interconnects a high-pressure compressor 37 and a high-pressure turbine 40. In this embodiment, the inner shaft 34 and the outer shaft 35 are supported at various axial locations by bearing systems 31 positioned within the engine static structure 33.

A combustor 42 is arranged between the high-pressure compressor 37 and the high-pressure turbine 40. A mid-turbine frame 44 may be arranged generally between the high-pressure turbine 40 and the low-pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low-pressure compressor 38 and the high-pressure compressor 37, is mixed with fuel and burned in the combustor 42, and is then expanded over the high-pressure turbine 40 and the low-pressure turbine 39. The high-pressure turbine 40 and the low-pressure turbine 39 rotationally drive the respective high-speed spool 32 and the low-speed spool 30 in response to the expansion.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies add or extract energy from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Although a specific architecture for a gas turbine engine is depicted in the disclosed non-limiting example embodiment, it should be understood that the concepts described herein are not limited to use with the shown and described configuration. For example, the teachings provided herein may be applied to other types of engines. Some such example alternative engines may include, without limitation, turbojets, turboshafts, and other turbofan configurations (e.g., wherein an intermediate spool includes an intermediate pressure compressor ("IPC") between a low-pressure compressor ("LPC") and a high-pressure compressor ("HPC"), and an intermediate pressure turbine ("IPT") between the high-pressure turbine ("HPT") and the low-pressure turbine ("LPT").

Figure 2:
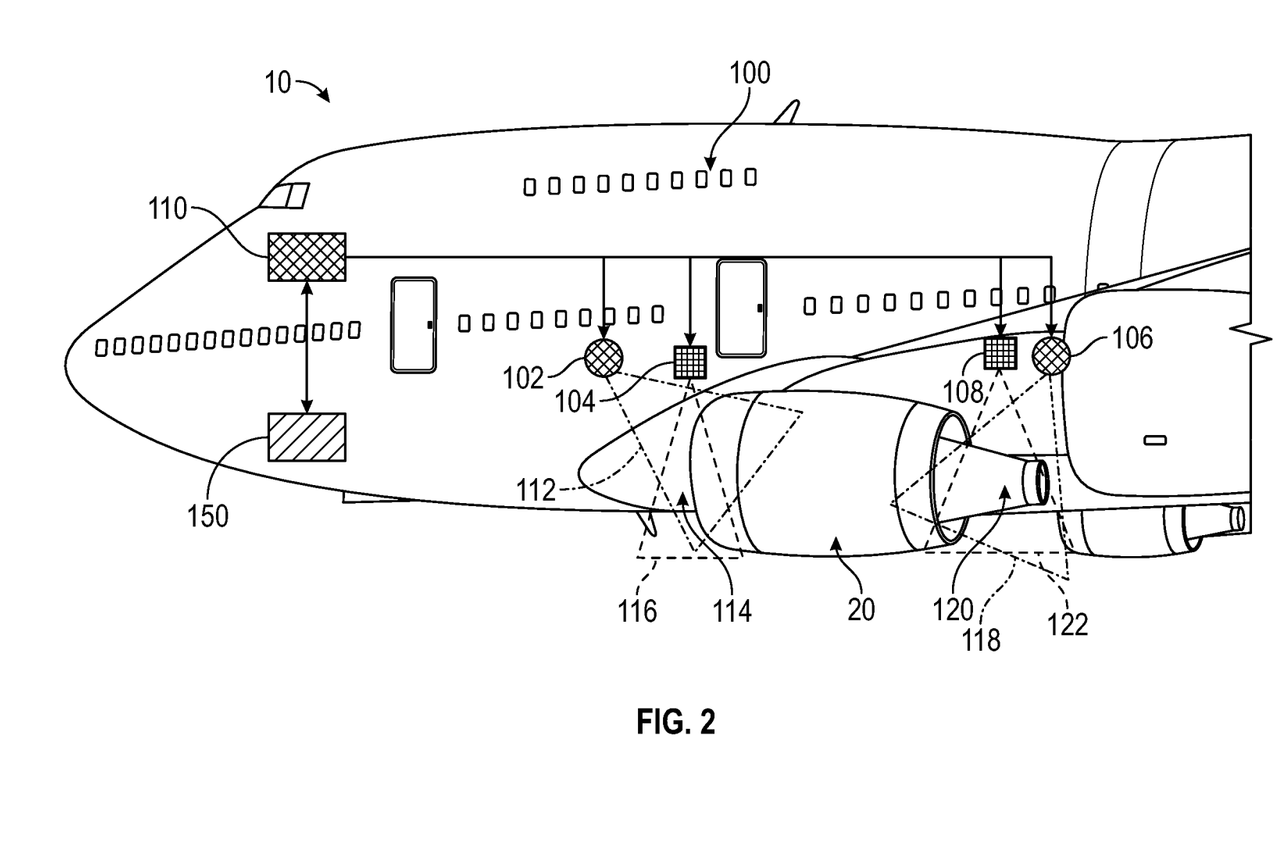
FIG. 2 depicts an optically-based propulsion mass flow and thrust measurement system according to a non-limiting embodiment of the present disclosure.

Turning now to FIG. 2, an optically-based propulsion mass flow and thrust measurement system 100 (hereinafter referred to as "the measurement system") is illustrated according to a non-limiting embodiment of the present disclosure. The measurement system 100 includes a front energy source 102, a forward sensor 104, a rear energy source 106, and a rear sensor 108. The front energy source 102 and the forward sensor 104 can operate together to establish a first imaging system. Similarly, the rear energy source 106 and the rear sensor 108 can operate together to establish a second imaging system. Each of the front energy source 102, forward sensor 104, rear energy source 106, and rear sensor 108 are in signal communication with a measurement controller 110, which facilitates control and analysis of the measurement system 100 as described in greater detail below.

According to a non-limiting embodiment illustrated in FIG. 2, the front energy source 102 includes a laser unit 102 that is coupled to the aircraft 10 and is configured to direct frontal laser energy 112 to a targeted first region 114 (e.g., a front region 114) of a gas turbine engine 20 of an aircraft 10. Although a single front energy source 102 is illustrated, it should be appreciated that additional front energy sources, potentially useful for improving spatial coverage of the energy sheet at the targeted front region 114 or improving sensitivity to velocity, temperature, or density, can be implemented without departing from the scope of the present disclosure. In addition, although a front laser unit 102 will be described going forward, it should be appreciated that other types of energy sources capable of directing energy that can be sensed thereat can be employed without departing from the scope of the invention.

Figure 3:
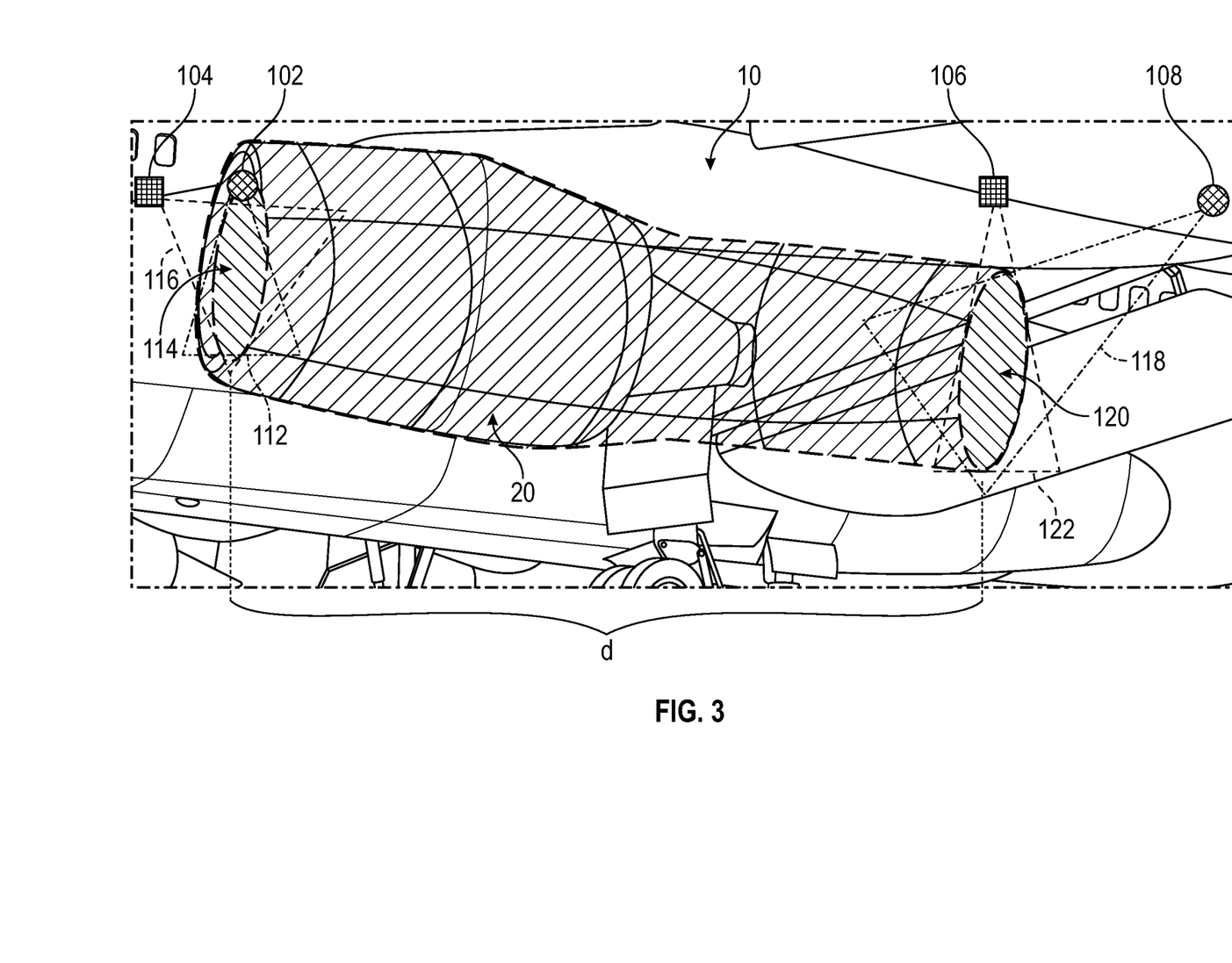
FIG. 3 depicts an optically-based propulsion mass flow and thrust measurement system according to another non-limiting embodiment of the present disclosure.

According to another non-limiting embodiment, the front laser unit 102 is arranged within the inlet of the gas turbine engine 20 (see FIG. 3). In this manner, the frontal laser energy 112 can impinge directly on the inner surface of the gas turbine engine 20. Accordingly, the targeted front region 114 can be focused on the inner surface (e.g., a first control surface) of the engine 20 and imaging can be performed from the inner engine nacelle.

The measurement controller 110 outputs a control signal that drives the front laser unit 102. For example, the measurement controller 110 can output a control signal that drives the laser unit 102 to output the frontal laser energy 112 according to a set frequency and/or wavelength. During flight of the aircraft 10, the frontal laser energy 112 (e.g. photons) interact with particles of the airflow input to the engine 20 to produce an inflow Rayleigh/Mie scattering effect occurring at the targeted front region 114 of a gas turbine engine 20.

The front sensor 104 is coupled to the aircraft 10 and has a front field of view (FOV) 116 that captures the targeted front region 114 of the gas turbine engine 20. Although a single front sensor 104 is illustrated, it should be appreciated that additional front sensors, which may provide improved spatial coverage or sensitivity of the measurement, can be implemented without departing from the scope of the present disclosure. The front sensor 104 is configured to detect laser scattering of molecules caused by an inflow Rayleigh/Mie scattering effect occurring at the targeted front region 114 of a gas turbine engine 20 and produce an inflow Rayleigh scattering distribution. In one or more non-limiting embodiments, the front sensor 104 includes a front sensor filter (not shown) that filters the detected inflow Rayleigh scattering spectrum to define the targeted inflow spectra, also referred to as a "spectral distribution". The targeted inflow spectra can be utilized to determine input mass flow associated with the gas turbine engine 20.

The rear energy source 106 is coupled to the aircraft 10 and is configured to direct rear energy 118 to a targeted second region 120 (e.g., a rear region 120) of the gas turbine engine 20. Although a single rear energy source 106 is illustrated, it should be appreciated that additional rear energy sources, potentially useful for improving spatial coverage of the energy sheet at the targeted second region 120 or improving sensitivity to velocity, temperature, or density, can be implemented without departing from the scope of the present disclosure. In addition, although a rear laser unit 106 will be described going forward, it should be appreciated that other types of energy sources capable of directing energy that can be sensed thereat can be employed without departing from the scope of the invention.

The distance from the targeted front region 114 to the targeted rear region 120 defines a "relaxation distance" (d) such that pressure variations at region 120 are reduced for mitigating uncertainties due to pressure contribution to thrust. Accordingly, the location of the targeted rear region 120 can set the relaxation distance, which in turn varies the contribution of pressure on the overall calculated thrust. In one or more non-limiting embodiments, the location of the targeted rear region 120 can be selected so as to minimize the contribution of pressure on the overall calculated thrust force.

With continued reference to FIG. 2, the measurement controller 110 is configured to output a control signal that drives the rear laser unit 106. For example, the measurement controller 110 can output a control signal that drives the rear laser unit 106 to output the rear energy 118 according to a set frequency and/or wavelength. During flight of the aircraft 10, the rear laser energy 118 (e.g. photons) interact with particles of the exhaust output from the engine 20 to produce an outflow Rayleigh/Mie scattering effect occurring at the targeted rear region 120 of a gas turbine engine 20.

The rear sensor 108 is coupled to the aircraft 10 and has a rear FOV 122 that captures the targeted rear region 120 of the gas turbine engine 20. Although a single rear sensor 108 is illustrated, it should be appreciated that additional rear sensors can be implemented without departing from the scope of the present disclosure. The rear sensor 108 is configured to detect laser scattering of molecules caused by a rear Rayleigh/Mie scattering effect occurring at the targeted rear region 120 of a gas turbine engine 20 and produce an outflow Rayleigh scattering distribution. In one or more non-limiting embodiments, the rear sensor 108 includes a rear sensor filter (not shown) that filters the detected outflow Rayleigh scattering spectrum to define the targeted outflow spectra. The targeted outflow spectra can be utilized to determine an exhaust momentum flux with the gas turbine engine 20.

The measurement controller 110 is configured to process the targeted inflow spectra to determine a first mass flow ingested by the engine 20, and to process the targeted outflow spectra to determine a second mass flow exhausted by the engine 20. Based on the first and second mass flows, the measurement controller 100 can generate thrust measurements during the in-flight of the aircraft 10. For example, the measurement controller 110 can process the targeted inflow spectrum to determine an inflow temperature value (e.g., a local static fluid temperature) ($T_1$) and an inflow density value (e.g., local static fluid density) ($\rho_1$) at each point on the image produced according to the output of the front sensor 104. The measurement controller 110 can further apply a Doppler shift to the targeted inflow spectrum to determine an inflow velocity magnitude value ($U_1$) (e.g., a velocity magnitude normal to a control volume surface of the engine 20) at each point on the image produced according to the front sensor 104 and associated with the targeted front region 114. In one or more non-limiting embodiments, the measurement controller 110 can store one or more models indicating known temperature, density and velocities that produce a given inflow spectrum. Accordingly, the measurement controller 110 can process the targeted inflow spectrum by comparing it to the stored spectrum models, and then extracting the inflow temperature value ($T_1$), the inflow density value ($\rho_1$), and the inflow velocity magnitude value ($U_1$) that defines a matching spectrum model.

Similarly, the measurement controller 110 can process the targeted outflow spectrum to determine an outflow temperature value (e.g., a local static fluid temperature) ($T_2$) and an outflow density value (e.g., local static fluid density) ($\rho_2$) at each point on the image produced according to the output of the rear sensor 108 and associated with the targeted rear region 120 of the gas turbine engine 20. The measurement controller 110 can further apply a Doppler shift to the targeted output spectrum to determine an outflow velocity magnitude value ($U_2$) (e.g., a velocity magnitude normal to a control volume surface of the engine 20) at each point on the image produced according to the output of the rear sensor 108 associated with the targeted rear region 120. As described herein, the measurement controller 110 can process the targeted outflow spectrum by comparing it to the stored spectrum models, and then extracting the outflow temperature value ($T_2$), the outflow density value ($\rho_2$), and the outflow velocity magnitude value ($U_2$) that defines a matching spectrum model.

Based on the distribution of inflow temperature ($T_1$) and inflow density ($\rho_1$), the measurement controller 110 can calculate an inflow pressure value ($P_1$). Similarly, the measurement controller 110 can calculate an outflow pressure value ($P_2$) based on the distribution of outflow temperature ($T_2$) and outflow density ($\rho_2$). Both the inflow pressure value ($P_1$) and the outflow pressure value ($P_2$) can be calculated, for example, according to the following equation:

$$P_i = \rho_i R_d T_i \qquad \text{Eq. 1}$$

where, "i" indicates corresponds to the $i^{th}$ target region or control surface; and where $R_d$ is the mass-specific gas constant corresponding to air for inflow and exhaust gases (nearly equal to that of air for a turbofan engine) for outflow.

In addition, the measurement controller 110 can calculate a thrust force ($\mathcal{T}$) of the gas turbine engine 20 while the aircraft 10 is in flight based on the inflow temperature ($T_1$), inflow density ($\rho_1$), and inflow velocity magnitude ($U_1$) values along with the distribution of outflow temperature ($T_2$), outflow density ($\rho_2$) and outflow velocity magnitude values ($U_2$). In one or more non-limiting embodiments, the measurement controller 110 first calculates an inflow integrated mass flow ($\dot{m}_1$) associated with the targeted front region 114 and an outflow integrated mass flow ($\dot{m}_2$) associated with the targeted rear region 120. The inflow and outflow integrated mass flows can each be calculated based on the following equation:

$$\dot{m}_i = [\oiint \rho_i U_i dA]_i \qquad \text{Eq. 2}$$

where, dA is the differential area over which control surface integration occurs and "i" indicates corresponds to the $i^{th}$ target region or control surface (e.g., the inflow associated with the front region 114 or the outflow associated with the rear region 120).

The thrust force ($\mathcal{T}$) produced by the engine 20 is the difference between the momentum flux and pressure exerted on the targeted front region 114 (i.e., the inlet) and targeted rear region 120 (i.e., the outlet):

$$\mathcal{T} = [\oiint (\rho_1 U_1^2 - p_1) dA]_{inlet} - [\oiint (\rho_2 U_2^2 - p_2) dA]_{outlet} \qquad \text{Eq. 3}$$

where, $p_1$ is the inflow pressure (e.g., the local static fluid pressure of fluid) associated with the targeted front region 114, and $p_2$ is the outflow pressure (e.g., the local static fluid pressure of fluid) associated with the targeted rear region 120.

In one or more non-limiting embodiments, the inflow integrated mass flow ($\dot{m}_1$) may be computed using Eq. 2 via direct measurement at the targeted front region 114 and standard flight instrumentation used to obtain the flight velocity ($U_\infty$) simplifying the first term in Eq. 3:

$$\dot{m}_1 U_\infty = [\oiint (\rho_1 U_1^2 - p_1) dA]_{inlet} \qquad \text{Eq. 4}$$

The expression described in Eq. 4 is true due to conservation of mass and momentum for the stream of flow that enters the inlet. The measurement controller 110 can calculate the thrust force ($\mathcal{T}$) of the gas turbine engine by direct application of Eq. 3 using the measurements at targeted front region 114 and targeted rear region 120 or with the simplified equation combining Eq. 3 and Eq. 4 which would carry reduced uncertainties due to the elimination of the pressure term for the inlet:

$$\mathcal{T} = \dot{m}_1 U_\infty - [\oiint (\rho_2 U_2^2 - p_2)dA]_{outlet} \quad \text{Eq. 5}$$

With continued reference to FIG. 2, the aircraft 10 includes an aircraft controller 150 in signal communication with the measurement controller 150. Although the measurement controller 110 is illustrated as being externally located from the aircraft controller 150, it should be appreciated that the measurement controller 110 can be embedded in the aircraft controller 150 to provide a single controller. The aircraft controller 150 is configured to control various operations of the aircraft 10 and/or the gas turbine engine 20. In one or more non-limiting embodiments, the measurement controller 110 can output the calculated thrust force ($\mathcal{T}$), which the aircraft controller 150 can use to control the aircraft 10 and/or engine 20.

For example, the aircraft controller 150 can utilize the calculated thrust force ($\mathcal{T}$) as feedback information to control the gas turbine engine 20 and perform engine trimming operations aimed to minimize fuel burn. According to another example, the aircraft controller 150 can utilize the calculated thrust force ($\mathcal{T}$) provided by the measurement controller 110 to control the engine 20 to reduce noise operations. The calculated thrust force ($\mathcal{T}$) can also be utilized by the aircraft controller 150 to perform health monitoring operations. For example, the aircraft controller 150 can utilize the calculated thrust force ($\mathcal{T}$) to detect unexpected changes in exhaust flow indicative of a possible engine fault.

As described herein, various non-limiting embodiments described herein provide an optically-based propulsion mass flow and thrust measurement system capable of performing a direct, non-intrusive measurement of thrust and mass flow of an installed propulsion engine of an aircraft while in flight. The ability to accurately and reliably measure installed engine thrust in flight as provided by the measurement system described herein supports both engine manufacturers and airframe manufacturers in determining the delivered thrust level, which optimizes engine operation compared to current methods for estimating mass flow and net thrust that rely upon extrapolations from ground-based measurements.

As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description but is only limited by the scope of the appended claims.

What is claimed is:

1. An optically-based measurement system comprising:
    a first imaging system disposed adjacent an inlet of a gas turbine engine of an aircraft, the first imaging system configured to perform a first imaging of a first target area of the inlet of the gas turbine engine of the aircraft to generate a targeted inflow spectrum, the first imaging performed while the gas turbine engine operates while the aircraft is in flight;
    a second imaging system disposed adjacent an outlet of the engine, the second imaging system configured to perform a second imaging of a second target area of the outlet of the gas turbine engine of an aircraft to generate a targeted outflow spectrum, the second imaging performed while the gas turbine engine operates while the aircraft is in flight; and
    a measurement controller configured to calculate a first mass flow and a second mass flow of the gas turbine engine based at least in part on the first imaging of the inlet and the second imaging of the outlet, respectively,
    wherein based on the first mass flow the measurement controller determines an inflow temperature (T1), an inflow density (ρ1), and an inflow velocity magnitude (U1), and determines an inlet momentum flux based on the inflow temperature (T1), the inflow density (ρ1), and the inflow velocity magnitude (U1),
    wherein based on the second mass flow the measurement controller determines an outflow temperature (T2), an outflow density (ρ2) and an outflow velocity magnitude values (U2), and determines an outlet momentum flux based on the outflow temperature (T2), the outflow density (ρ2) and the outflow velocity magnitude values (U2),
    wherein the inflow temperature (T1), the inflow density (ρ1), and the inflow velocity magnitude (U1) are determined by comparing the targeted inflow spectrum to one or more first stored inflow spectrum models, and then extracting the inflow temperature value (T1), the inflow density value (ρ1), and the inflow velocity magnitude value (U1) that defines a matching inflow spectrum model,
    wherein the outflow temperature (T2), the outflow density (ρ2), and the outflow velocity magnitude (U2) are determined by comparing the targeted outflow spectrum to one or more stored outflow spectrum models, and then extracting the outflow temperature value (T2), the outflow density value ($\rho 2$), and the outflow velocity magnitude value ($U2$) that defines a matching outflow spectrum model, and wherein the measurement controller is configured to calculate a thrust force of the gas turbine engine while the aircraft is in flight based on a difference between the inlet momentum flux and the outlet momentum flux.

2. The optically-based measurement system of claim 1, wherein the measurement controller calculates the first mass flow and the second mass flow based at least in part on the first imaging and the second imaging, respectively.

3. The optically-based measurement system of claim 2, wherein the measurement controller calculates the thrust force of the gas turbine engine while the aircraft is in flight based at least in part on the calculated first mass flow and the calculated second mass flow.

4. The optically-based measurement system of claim 1, wherein the first imaging system comprises:

a first energy source configured to direct first energy at the first target area; and a first sensor configured to detect a first energy spectrum at the first target area resulting from the first energy, and wherein the second imaging system comprises:

a second energy source configured to direct second energy at the second target area; and a second sensor configured to detect a second energy spectrum at the second target area resulting from the second energy.

5. The optically-based measurement system of claim 4, wherein the first energy source is coupled to a body of the aircraft and is remotely located from the gas turbine engine.

6. The optically-based measurement system of claim 4, wherein the first energy source is disposed within the inlet of the gas turbine engine.

* * * * *